United States Patent Office 3,261,843
Patented July 19, 1966

3,261,843
METHOD OF OBTAINING NICOTINIC AND ISONICOTINIC ACIDS OF PYRIDINE BASES AS WELL AS OF CHINOLINE AND OF ITS DERIVATIVES
Wojciech Swietoslawski, Pasteura—Street 1; Jerzy Bialek, Stoleczna—Street 2; Andrzej Bylicki, Staroscinska—Street 3; and Andrzej Kotarski, Grojecka—Street 40, all of Warsaw, Poland
No Drawing. Filed Feb. 27, 1961, Ser. No. 91,662
Claims priority, application Poland, Feb. 26, 1960, 93,070
8 Claims. (Cl. 260—295.5)

There are numerous known methods of obtaining nicotinic acid by oxidizing suitable organic bases by means of sulphuric acid, or of mixtures of sulphuric acid with nitric acid in the presence of selenium or other catalysts at a temperature of 260–320° C.

A very disadvantageous factor of this method is the highly endothermic character of this reaction. This circumstance contributes to the fact that both in the continuous and in the batch oxidation process of chinoline or pyridine bases it becomes necessary to supply great quantities of heat to the reactor, which in conjunction with the great mass of starting materials presents considerable difficulties and to a large extent limits the possibility of using this process on a technical scale.

A further disadvantageous factor of the chinoline oxidation process according to the known methods is the considerable quantity of sulphuric acid taking part in the reaction. Thus, for example, to obtain 1 mole of nicotinic acid it is necessary to use, according to the equation, 9 moles of sulphuric acid. This results in a low concentration of the base in the great mass of starting mixture decreasing only during the reaction and the progressing decomposition of the sulphuric acid to sulphur dioxide which escapes from the reaction medium. In reality, to obtain a good yield of nicotinic acid it is necessary to use 12–15 moles of sulphuric acid per 1 mole of chinoline, i.e. a great excess when compared with the stoichiometric quantity.

At a temperature of above 320° C., usually attained at the end of the process, both the pyridine ring of the chinoline and the nicotinic acids obtained as a result of the oxidation become oxidized to a large extent, which decreases the yield of the reaction and simultaneously increases the consumption of sulphuric acid. The speeds of the decomposition and of the oxidation of the nicotinic acids at a temperature of above 300° C. depends to a large extent on the excess of sulphuric acid which has a hindering influence on the decomposition.

Thus, e.g., in order to obtain a yield of 70–90% of nicotinic acid from chinoline it is necessary to use such an excess of sulphuric acid that in the end product of the oxidation, carried out at a temperature of above 300° C., at least 5–8 moles of sulphuric acid per 1 mole of nicotinic acid be retained.

However, in addition to the further increase of the mass of the starting mixture, the great quantity of sulphuric acid contained in the oxidation product (or of sulphates obtained after the neutralization of the acid) causes additional difficulties also in the process of separating pure nicotinic acids from the obtained mixtures, which makes it impossible to separate these acids directly from the aqueous solution, for example by crystallization. The method according to the present invention avoids the above disadvantages and difficulties.

According to the present invention, during the oxidation of organic bases by means of sulphuric acid in the presence of catalysts, the reaction medium is supplied with sulphur trioxide, which combining with the water arising during the reaction, restores the sulphuric acid and avoids its decomposition, whereby the character of the reaction changes from endothermic to exothermic and the quantity of sulphuric acid in the reaction medium can be maintained during the oxidation process approximately at a constant level chosen so as to secure a most convenient course of the process and the highest yield of nicotinic acid (e.g. 6 moles of sulphuric acid per 1 mole of chinoline). In the final phase of the process, after termination of the oxidation reaction, the sulphuric-acid content is reduced by distilling off its excess at a temperature of below 300° C. under decreased pressure, thereby avoiding decomposition of the nicotinic acid and obtaining a high concentration of this acid in the end product, this affording very favourable conditions for its separation.

Below there are stated by way of example two stoichiometric equations, one of which corresponds to the known endothermic reaction:

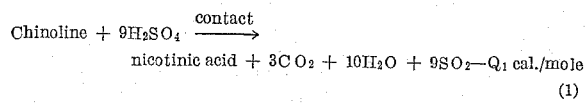

$$\text{Chinoline} + 9H_2SO_4 \xrightarrow{\text{contact}}$$
$$\text{nicotinic acid} + 3CO_2 + 10H_2O + 9SO_2 - Q_1 \text{ cal./mole} \quad (1)$$

and the other:

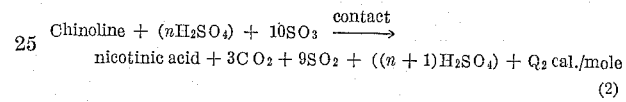

$$\text{Chinoline} + (nH_2SO_4) + 10SO_3 \xrightarrow{\text{contact}}$$
$$\text{nicotinic acid} + 3CO_2 + 9SO_2 + ((n+1)H_2SO_4) + Q_2 \text{ cal./mole} \quad (2)$$

to the course of the reaction according to the present invention.

In the first case the reaction requires a supply of a great quantity of heat, while the second one comes with the simultaneous giving off of heat. In Equation 2 on the left hand side the $nH_2SO_4$ is put into parentheses to emphasize that this acid, the quantity of which may vary depending on the condition of the apparatus and of the temperature at which the process is carried out, does not change in the general equation. On the right hand side of Equation 2 $(n+1)$ $H_2SO_4$ shows that in the reaction one sulphuric acid molecule is formed due to the fact that the water-molecule arising during the oxidation combines with $SO_3$.

The order of magnitude of the value $-Q_1$ and $+Q_2$ is:

$$-Q_1 = 106 \text{ cal./mole}$$
$$+Q_2 = 120 \text{ cal./mole}$$

The exothermic character of the reaction according to the invention affords the possibility of using large reactors or reaction chambers of any cross section, the heat excess arising in the reaction space being moderated by supplying a sulphuric acid excess and eventually in sufficient quantities of sulphur trioxide (5–10 moles per 1 mole of chinoline) so that the reaction takes place only partly according to Equation 2 and partly according to the Equation 1. The exothermic effect of the reaction may be increased by introducing the bases in vapour form and also by introducing, either together with the sulphuric acid or alone, a certain quantity of water or steam which combines with the sulphur trioxide to form sulphuric acid and increase the heat effect of the process.

In addition, the use of gaseous sulphur trioxide affords the possibility of considerably ameliorating the economy of the process by directly utilizing the mixture of gases leaving the contact chamber of the sulphric acid factory and containing in addition to sulphur trioxide also neutral gases such as oxygen, nitrogen and other air components, which it has been ascertained does not exercise any detrimental influence on the course of the process. The gases leaving the reaction medium, which consists mainly of sulphur dioxide and carbon dioxide, may in this case be returned to oxidation and utilized for the production of sulphuric acid.

The decomposition of nicotinic acids which takes place at a temperature of above 300° C. with great speed, especially in the presence of selenium, in a mixture containing less than 6 moles of sulphuric acid per 1 mole of nicotinic acid is stopped nearly entirely if the temperature of the reaction falls down below 300° C. When maintaining the temperature within 270–290° C., the greater part of the sulphuric acid may be distilled off under decreased pressure. There is obtained in the distillate the recovered concentrated sulphuric acid which may be returned to the next oxidation charge, while in the remainder is obtained nicotinic acid sulphate, eventually with a small excess of sulphuric acid, and the catalyst.

Utilizing the great solubility of alkaline sulphates (e.g. ammonium sulphate) in water and the slight solubility of nicotinic acids, these acids may be separated with great yield, amounting to about 80–90%, directly from the aqueous solution after neutralizing to a suitable pH, while from a mixture containing 6–8 moles of sulphate per 1 mole of nicotinic acid the separation in this way would not at all be possible.

In the oxidation of chinoline or its derivatives, or mono- or dimethyl derivatives of pyridine, it has been ascertained that if the oxidizing process is carried out at a suitably high temperature (above 300° C.), simultaneously with the oxidizing process the decarboxylation in the 2-position takes place, and instead of two operations, oxidation and decarboxylation, carried out separately, the whole process takes place in one operation and the same space in which the reaction comes to pass.

The oxidation of the particular bases such as chinoline, isochinoline, 3-picoline, 4-picoline, and of their mixtures occurs in an analogous manner when using the method according to the invention. Instead of dividing into the mixture of bases usually obtained in suitable fractions produced by the chemical coke industry into its components, in some cases (e.g. in the event of a mixture of 3- and 4-picolines or chinoline and isochinoline) it may be preferable to oxidize the mixture of a few isomers, thus obtaining in the oxidation product a mixture of pyridine carboxylic-acids e.g. nicotinic and isonicotinic acid, which is then separated into pure components according to known methods. The following example is given to illustrate the present invention.

*Example.*—90.2 kg. of a mixture consisting of 80.3% of sulphuric acid, 18.0% of chinoline and 1.7% of selenium, are passed through a continuously acting reactor. In counter-current to the falling reaction substrates, 77 kg. of gaseous sulphur trioxide heated to about 200° C. are introduced from below. The reaction time lasts nine hours. In the initial phase of the process the reactor is electrically heated, maintaining a difference of temperature from 250° C. at the place of introducing the mixture to 320° C. in the terminal part. After stabilization of the course of the reaction, heating is switched off, except in the end member, the correct temperature of 220–320° C. being maintained in the reactor due to the reaction heat and regulated by the speed of supply of the gaseous sulphur trioxide.

The product leaving the reactor at a temperature of about 320° C. is introduced into a vacuum distiller, in which at a temperature of about 290° C. the expulsion of a considerable quantity of sulphuric acid through a cooler into a receptacle takes place.

There is thus obtained 39.85 kg. of an oxidation product consisting of: 35% of nicotinic acid, 64% of sulphuric acid and 1% of selenium or other impurities such as sulfochinoline, and 59.18 kg. of sulphuric acid containing compounds of selenium which are returned to the next oxidation charge.

What we claim is:

1. The method of oxidizing pyridine bases to pyridine carboxylic acids, which comprises heating a pyridine base selected from the group consisting of quinoline, dimethyl pyridines, isoquinoline, 3-picoline and 4-picoline dissolved in sulfuric acid, sulfur trioxide and a catalyst adapted to catalyze oxidation of said pyridine base to a temperature sufficiently high to cause oxidation of said pyridine base to the corresponding pyridine carboxylic acid, and thereby forming a reaction mass comprising said pyridine carboxylic acid, sulfur dioxide, water and unreacted pyridine base; and adding sulfur trioxide to said reaction mass, said sulfur trioxide reacting with said water to form sulfuric acid and heat which effect oxidation of unreacted pyridine base to convert the same to corresponding pyridine carboxylic acid without outside addition of heat for the promotion of the endothermic oxidation reaction of said pyridine base.

2. The method of oxidizing pyridine bases to pyridine carboxylic acids, which comprises heating a pyridine base selected from the group consisting of quinoline, dimethyl pyridines, isoquinoline, 3-picoline and 4-picoline dissolved in sulfuric acid, sulfur trioxide and a catalyst adapted to catalyze oxidation of said pyridine base to a temperature sufficiently high to cause oxidation of said pyridine base to the corresponding pyridine carboxylic acid, and thereby forming a reaction mass comprising said pyridine carboxylic acid, sulfur dioxide, water and unreacted pyridine base; adding sulfur trioxide to said reaction mass, said sulfur trioxide reacting with said water to form sulfuric acid and heat which effect oxidation of unreacted pyridine base to convert the same to corresponding pyridine carboxylic acid without outside addition of heat for the promotion of the endothermic oxidation reaction of said pyridine base; and continuing the addition of sulfur trioxide to the reaction mass until substantially all of said pyridine base has been converted to the corresponding pyridine carboxylic acid.

3. The method of oxidizing pyridine bases to pyridine carboxylic acids, which comprises heating a pyridine base selected from the group consisting of quinoline, dimethyl pyridines, isoquinoline, 3-picoline and 4-picoline dissolved in sulfuric acid, sulfur trioxide and a catalyst adapted to catalyze oxidation of said pyridine base to a temperature of about 250–320° C. so as to cause oxidation of said pyridine base to the corresponding pyridine carboxylic acid, and thereby forming a reaction mass comprising said pyridine carboxylic acid, sulfur dioxide, water and unreacted pyridine base; and adding sulfur trioxide to said reaction mass, said sulfur trioxide reacting with said water to form sulfuric acid and heat which effect oxidation of unreacted pyridine base to convert the same to corresponding pyridine carboxylic acid without outside addition of heat for the promotion of the endothermic oxidation reaction of said pyridine base.

4. The method of oxidizing pyridine bases to pyridine carboxylic acids, which comprises heating a pyridine base selected from the group consisting of quinoline, dimethyl pyridines, isoquinoline, 3-picoline and 4-picoline dissolved in sulfuric acid, sulfur trioxide and a selenium catalyst adapted to catalyze oxidation of said pyridine base to a temperature of about 250–320° C. so as to cause oxidation of said pyridine base to the corresponding pyridine carboxylic acid, and thereby forming a reaction mass comprising said pyridine carboxylic acid, sulfur dioxide, water and unreacted pyridine base; and adding sulfur trioxide to said reaction mass, said sulfur trioxide reacting with said water to form sulfuric acid and heat which effect oxidation of unreacted pyridine base to convert the same to corresponding pyridine carboxylic acid without outside addition of heat for the promotion of the endothermic oxidation reaction of said pyridine base.

5. The method of oxidizing pyridine bases to pyridine carboxylic acids, which comprises heating a pyridine base selected from the group consisting of quinoline, dimethyl pyridines, isoquinoline, 3-picoline and 4-picoline dissolved in sulfuric acid, sulfur trioxide and a selenium catalyst adapted to catalyze oxidation of said pyridine base to a temperature of about 250–320° C. so as to cause oxidation of said pyridine base to the corresponding pyridine carboxylic acid, and thereby forming a reaction mass comprising said pyridine carboxylic acid, sulfur dioxide, water and unreacted pyridine base; adding sulfur trioxide to said reaction mass, said sulfur trioxide reacting with said water to form sulfuric acid and heat which effect oxidation of unreacted pyridine base to convert the same to corresponding pyridine carboxylic acid without outside addition of heat for the promotion of the endothermic oxidation reaction of said pyridine base; and continuing the addition of sulfur trioxide to the reaction mass until substantially all of said pyridine base has been converted to the corresponding pyridine carboxylic acid.

6. The method of oxidizing pyridine bases to pyridine carboxylic acids, which comprises heating a pyridine base selected from the group consisting of quinoline, dimethyl pyridines, isoquinoline, 3-picoline and 4-picoline dissolved in sulfuric acid, sulfur trioxide and a catalyst adapted to catalyze oxidation of said pyridine base to a temperature sufficiently high to cause oxidation of said pyridine base to the corresponding pyridine carboxylic acid, and thereby forming a reaction mass comprising said pyridine carboxylic acid, sulfur dioxide, water and unreacted pyridine base; adding sulfur trioxide to said reaction mass, said sulfur trioxide reacting with said water to form sulfuric acid and heat which effect oxidation of unreacted pyridine base to convert the same to corresponding pyridine carboxylic acid without outside addition of heat for the promotion of the endothermic oxidation reaction of said pyridine base, thereby forming a reaction mass comprising said pyridine carboxylic acid and sulfuric acid; and distilling off said sulfuric acid from the reaction mass under decreased pressure at a temperature below 300° C. so as to remove said sulfuric acid while avoiding decomposition of the pyridine carboxylic acid, thereby obtaining said pyridine carboxylic acid in high concentration.

7. The method of oxidizing pyridine bases to pyridine carboxylic acids, which comprises heating a pyridine base selected from the group consisting of quinoline, dimethyl pyridines, isoquinoline, 3-picoline and 4-picoline dissolved in sulfuric acid, sulfur trioxide and a catalyst adapted to catalyze oxidation of said pyridine base to a temperature sufficiently high to cause oxidation of said pyridine base to the corresponding pyridine carboxylic acid, and thereby forming a reaction mass comprising said pyridine carboxylic acid, sulfur dioxide, water and unreacted pyridine base; adding sulfur trioxide to said reaction mass, said sulfur trioxide reacting with said water to form sulfuric acid and heat which effect oxidation of unreacted pyridine base to convert the same to corresponding pyridine carboxylic acid without outside addition of heat for the promotion of the endothermic oxidation reaction of said pyridine base; continuing the addition of sulfur trioxide to the reaction mass until substantially all of said pyridine base has been converted to the corresponding pyridine carboxylic acid, thereby forming a reaction mass comprising said pyridine carboxylic acid and sulfuric acid; and distilling off said sulfuric acid from the reaction mass under decreased pressure at a temperature below 300° C. so as to remove said sulfuric acid while avoiding decomposition of the pyridine carboxylic acid, thereby obtaining said pyridine carboxylic acid in high concentration.

8. The method of oxidizing pyridine bases to pyridine carboxylic acids, which comprises heating a pyridine base selected from the group consisting of quinoline, dimethyl pyridines, isoquinoline, 3-picoline and 4-picoline dissolved in sulfuric acid, sulfur trioxide and a selenium catalyst adapted to catalyze oxidation of said pyridine base to a temperature of about 250–320° C. so as to cause oxidation of said pyridine base to the corresponding pyridine carboxylic acid, and thereby forming a reaction mass comprising said pyridine carboxylic acid, sulfur dioxide, water and unreacted pyridine base; adding sulfur trioxide to said reaction mass, said sulfur trioxide reacting with said water to form sulfuric acid and heat which effect oxidation of unreacted pyridine base to convert the same to corresponding pyridine carboxylic acid without outside addition of heat for the promotion of the endothermic oxidation reaction of said pyridine base; continuing the addition of sulfur trioxide to the reaction mass until substantially all of said pyridine base has been converted to the corresponding pyridine carboxylic acid, thereby forming a reaction mass comprising said pyridine carboxylic acid and sulfuric acid; and distilling off said sulfuric acid from the reaction mass under decreased pressure at a temperature below 300° C. so as to remove said sulfuric acid while avoiding decomposition of the pyridine carboxylic acid, thereby obtaining said pyridine carboxylic acid in high concentration.

References Cited by the Examiner

UNITED STATES PATENTS

| | | | |
|---|---|---|---|
| 2,436,660 | 2/1948 | Mueller | 260—295 |
| 2,723,272 | 11/1955 | Mueller | 260—295.5 |
| 2,748,137 | 5/1956 | Hultquist et al. | 260—295.5 |
| 2,999,094 | 9/1961 | O'Brochta | 260—295.5 |

FOREIGN PATENTS

| | | |
|---|---|---|
| 538,305 | 3/1957 | Canada. |
| 538,624 | 3/1957 | Canada. |

OTHER REFERENCES

Daniels et al., "Physical Chemistry," 2nd ed., p. 63 (Wiley) (1961).

Woodward et al., "Ind. Eng. Chem.," vol. 36, p. 544–6 (1944).

WALTER A. MODANCE, *Primary Examiner.*

IRVING MARCUS, DUVAL T. McCUTCHEN,
*Examiners.*